(12) United States Patent
Thomas

(10) Patent No.: US 8,234,312 B2
(45) Date of Patent: Jul. 31, 2012

(54) SCHEMA MAPPING AND DATA TRANSFORMATION ON THE BASIS OF LAYOUT AND CONTENT

(75) Inventor: Susan Marie Thomas, Karlsruhe (DE)

(73) Assignee: SAP AG, Walldorf (DE)

( * ) Notice: Subject to any disclaimer, the term of this patent is extended or adjusted under 35 U.S.C. 154(b) by 263 days.

(21) Appl. No.: 11/363,234

(22) Filed: Feb. 28, 2006

(65) Prior Publication Data

US 2007/0203922 A1 Aug. 30, 2007

(51) Int. Cl.
G06F 17/30 (2006.01)
G06F 17/00 (2006.01)

(52) U.S. Cl. .................................. 707/803; 707/808

(58) Field of Classification Search ........... 707/100–102
See application file for complete search history.

(56) References Cited

U.S. PATENT DOCUMENTS

| | | | |
|---|---|---|---|
| 5,627,979 A | 5/1997 | Chang et al. | |
| 5,767,854 A * | 6/1998 | Anwar | 715/848 |
| 6,460,043 B1 | 10/2002 | Tabbara et al. | |
| 6,490,581 B1 | 12/2002 | Netshatfar et al. | |
| 6,718,320 B1 | 4/2004 | Subramanian et al. | |
| 6,785,689 B1 * | 8/2004 | Daniel et al. | 707/102 |
| 7,149,746 B2 * | 12/2006 | Fagin et al. | 707/102 |
| 2003/0088639 A1 | 5/2003 | Lentini et al. | |
| 2003/0149934 A1 | 8/2003 | Worden | |
| 2003/0217069 A1 | 11/2003 | Fagin et al. | |
| 2004/0199905 A1 | 10/2004 | Fagin et al. | |

OTHER PUBLICATIONS

Hong-Hai Do et al., "COMA—A System for Flexible Combination of Schema Matching Approaches," Proceedings of the 28th VLDB Conference, Hong Kong, China (2002) (12 pages).
"XML Schema Mapping", Stylus Studio, 2005, http://stylusstudio.com/xml_schema_mapper_screenshot.html. (2 pages).
"UN/EDIFACT to XML Schema Mapping", Altova, 2005, http://www.altova.com/manual2006/mapforce/mapforce-enterprise/mf-funedifacttoxmlschemamappi.htm. (9 pages).
U.S. Appl. No. 11/363,239, filed Feb. 28, 2006, entitled "Schema Mapping and Data Transformation on the Basis of Conceptual Model".

* cited by examiner

Primary Examiner — Yicun Wu
(74) Attorney, Agent, or Firm — Finnegan, Henderson, Farabow, Garrett & Dunner, LLP

(57) ABSTRACT

Systems and methods are provided for schema mapping and the transformation of data. In accordance with one implementation, a computer-implemented method is provided that includes the steps of simultaneously displaying to a user, via a graphical user interface, layouts of the first and second documents, wherein the first and second documents have different data schemas and are instantiated with elements containing data values, and acquiring one or more associations from the user to map a first element of the first document to a second element of the second document. The method further includes the steps of indicating to the user a second association between elements in the first and second documents based on the association acquired from the user, and storing the association including the layout data corresponding to the first and second elements.

26 Claims, 9 Drawing Sheets

Figure 4

```xml
<xsd:schema xmlns:xsd="http://www.w3.org/2001/XMLSchema">

<xsd:annotation>
    <xsd:documentation xml:lang="en">
     Sample source schema
    </xsd:documentation>
  </xsd:annotation>

<xsd:element name="purchaseOrder" type="PurchaseOrderType"/>

<xsd:element name="comment" type="xsd:string"/>

<xsd:complexType name="PurchaseOrderType">
    <xsd:sequence>
      <xsd:element name="shipTo" type="USAddress"/>
      <xsd:element name="billTo" type="USAddress"/>
      <xsd:element ref="comment" minOccurs="0"/>
      <xsd:element name="items"  type="Items"/>
    </xsd:sequence>
    <xsd:attribute name="orderID" type="xsd:decimal"/>
    <xsd:attribute name="orderDate" type="xsd:date"/>
  </xsd:complexType>

<xsd:complexType name="USAddress">
    <xsd:sequence>
      <xsd:element name="name"   type="xsd:string"/>
      <xsd:element name="street" type="xsd:string"/>
      <xsd:element name="city"   type="xsd:string"/>
      <xsd:element name="state"  type="xsd:string"/>
      <xsd:element name="zip"    type="xsd:decimal"/>
    </xsd:sequence>
    <xsd:attribute name="country" type="xsd:NMTOKEN"
              fixed="US"/>
  </xsd:complexType>

<xsd:complexType name="Items">
    <xsd:sequence>
      <xsd:element name="item" minOccurs="0" maxOccurs="unbounded">
        <xsd:complexType>
          <xsd:sequence>
            <xsd:element name="productName" type="xsd:string"/>
            <xsd:element name="quantity">
              <xsd:simpleType>
                <xsd:restriction base="xsd:positiveInteger">
                  <xsd:maxExclusive value="100"/>
                </xsd:restriction>
              </xsd:simpleType>
            </xsd:element>
            <xsd:element name="USPrice"  type="xsd:decimal"/>
            <xsd:element ref="comment"   minOccurs="0"/>
            <xsd:element name="shipDate" type="xsd:date" minOccurs="0"/>
          </xsd:sequence>
          <xsd:attribute name="partNum" type="SKU" use="required"/>
        </xsd:complexType>
      </xsd:element>
    </xsd:sequence>
  </xsd:complexType>

</xsd:schema>
```

```xml
<?xml version="1.0" encoding="UTF-8"?>
<xsd:schema xmlns:xsd="http://www.w3.org/2001/XMLSchema">
<xsd:annotation>
    <xsd:documentation xml:lang="DE">
       Sample target schema
    </xsd:documentation>
</xsd:annotation>

<xsd:element name="Bestellung" type="BestellungTyp"/>

<xsd:element name="Kommentar" type="xsd:string"/>

<xsd:complexType name="BestellungTyp">
    <xsd:sequence>
       <xsd:element name="Lieferadresse" type="DeAdresse"/>
       <xsd:element name="Rechnungsadresse" type="DeAdresse"/>
       <xsd:element ref="Kommentar" minOccurs="0"/>
       <xsd:element name="Waren" type="WarenTyp"/>
    </xsd:sequence>
    <xsd:attribute name="bestelldatum" type="xsd:date"/>
</xsd:complexType>

<xsd:complexType name="DeAdresse">
    <xsd:sequence>
    <xsd:element name="Name" type="xsd:string"/>
    <xsd:element name="Strasse" type="xsd:string"/>
    <xsd:element name="Ort" type="xsd:string"/>
    <xsd:element name="PLZ" type="xsd:decimal"/>
    </xsd:sequence>
    <xsd:attribute name="BestellungID" type="xsd:decimal"/>
    <xsd:attribute name="land" type="xsd:NMTOKEN" fixed="DE"/>
</xsd:complexType>

<xsd:complexType name="WarenTyp">
    <xsd:sequence>
    <xsd:element name="Buch" minOccurs="0" maxOccurs="unbounded">
       <xsd:complexType>
         <xsd:sequence>
         <xsd:element name="Titel" type="xsd:string"/>
         <xsd:element name="Anzahl">
            <xsd:simpleType>
              <xsd:restriction base="xsd:positiveInteger">
                 <xsd:maxExclusive value="100"/>
              </xsd:restriction>
            </xsd:simpleType>
         </xsd:element>
         <xsd:element name="PreisEUR" type="xsd:decimal"/>
         <xsd:element ref="Kommentar" minOccurs="0"/>
         <xsd:element name="Lieferdatum" type="xsd:date" minOccurs="0"/>
         </xsd:sequence>
         <xsd:attribute name="ISBN" type="ISBNTyp" use="required"/>
       </xsd:complexType>
    </xsd:element>
    </xsd:sequence>
</xsd:complexType>

<xsd:simpleType name="ISBNTyp">
   <xsd:restriction base="xsd:string">
     <xsd:pattern value="\d{9}[0-9X]"/>
   </xsd:restriction>
</xsd:simpleType>

</xsd:schema>
```

Figure 5B

SCHEMA MAPPING AND DATA TRANSFORMATION ON THE BASIS OF LAYOUT AND CONTENT

TECHNICAL FIELD

The present invention generally relates to the field of data transformation. More particularly, the invention relates to systems and methods for schema mapping and the transformation of data.

BACKGROUND

Businesses, enterprises, and other organizations use databases to store and manage information ranging from inventory, clients, accounts, products, and the like. Moreover, businesses often need to manage and merge data from many different sources, including business partners, data feeds, legacy systems, and the like. The dramatic growth of the Internet and electronic commerce has increased businesses' reliance on the ability to capture, use, and integrate data from multiple sources encoded using different data schemas. Transforming data from one data schema to another requires data mappings between the data source(s) and a data target.

An important issue in modern information systems and electronic commerce applications is providing support for inter-operability of independent data sources. A broad variety of data is available on the Internet in distinct heterogeneous sources, stored under different formats such as: database formats (e.g., relational model), semi-structured formats (e.g., data type definitions, standard generalized markup language, extensible markup language schema), scientific formats, etc. Integration of such data is an increasingly important issue. The effort involved in such integration is considerable. Translation of data from one format or schema to another requires writing and managing complex data transformation programs or queries.

The issue of schema-mapping involves translating data from one independently created schema (e.g., a source schema) to another independently created schema (e.g., a target schema). The schemas may have different semantics, and this may be reflected in differences in their logical structures and constraints. Moreover, the source and target schema may not represent the same data. There may be source data that is not represented in the target, and should thus be omitted in the translation or mapping process. However, there may be a need in the target schema for data not represented in the source schema. In certain cases, values must be produced for undetermined elements or attributes in the target schema, e.g., target elements for which there is no corresponding source element. Values may be needed if the target element can not be null, such as elements in a key, and no default is given. More importantly, the creation of new values for such target elements is essential for ensuring the consistency of the target data.

Presently, tools that facilitate the task of transforming data work at a technical level. For example, there exist mapping tools that provide a user interface (UI) showing the structure of a data schema as a tree of elements used to encode the data. There also exists mapping tools that display trees of elements side-by-side for the two data schemas to be matched, in which the user is able to manually create links between matching elements of the source and target schemas. However, the approaches taken by existing mapping tools are time-consuming to the users and prone to error. Furthermore, these approaches are generally not suitable for a non-technical user for several reasons. For example, the existing approaches do not work with actual data values. Without data values to provide the user with a better understanding of the schema elements, the user is often unsure of how to interpret schema elements. Also, the existing approaches require a debugging cycle. In the existing approaches, the user first creates schema mappings, then invokes a tool to transform an example instance of the schema based on the schema mappings. The user must then manually check that the results of the transformation are correct.

Therefore, there is a need for systems and methods that provide a comprehensive yet straightforward solution to building, refining and managing mappings between heterogeneous schemas.

SUMMARY

Embodiments consistent with the present invention relate to systems and methods for schema mapping and the transformation of data on the basis of, for example, markup, layout and/or content. Embodiments consistent with the invention relate to systems and methods for schema mapping and data transformation of a source schema to a target schema. Further, as disclosed herein, embodiments of the invention may be computer-implemented through any suitable combination of hardware, software and firmware.

According to an embodiment of the invention, a computer-implemented method is provided for schema mapping and data transformation. The method comprises displaying to a user, with a graphical user interface (GUI), layouts of the first and second documents simultaneously, the first and second documents having different data schemas and being instantiated with elements containing data values. The method further includes acquiring, from the user, at least one association usable to map at least a first element of the first document to at least a second element of the second document, wherein each of the first and second elements contains layout data, and storing the association including the layout data corresponding to the first and second elements.

Consistent with another embodiment of the invention, a computer-readable medium is provided containing instructions for performing a method when the instructions are executed by a processor. The method comprises the steps of displaying to a user, with a graphical user interface (GUI), layouts of the first and second documents simultaneously, the first and second documents having different data schemas and being instantiated with elements containing data values. The method further includes acquiring, from the user, at least one association usable to map at least a first element of the first document to at least a second element of the second document, wherein each of the first and second elements contains layout data, and storing the association including the layout data corresponding to the first and second elements.

According to another embodiment of the invention, a system is provided for schema mapping and data transformation. The system comprises means for displaying to a user, with a graphical user interface (GUI), layouts of the first and second documents simultaneously, the first and second documents having different data schemas and being instantiated with elements containing data values. The system further includes means for acquiring, from the user, at least one association usable to map at least a first element of the first document to at least a second element of the second document, wherein each of the first and second elements contains layout data, and means for storing the association including the layout data corresponding to the first and second elements.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIG. 4 shows an exemplary user interface for direct mapping of schema and transformation of data;

FIG. 5A-5B show exemplary source and target schemas, respectively; and

DETAILED DESCRIPTION

Figure 1:
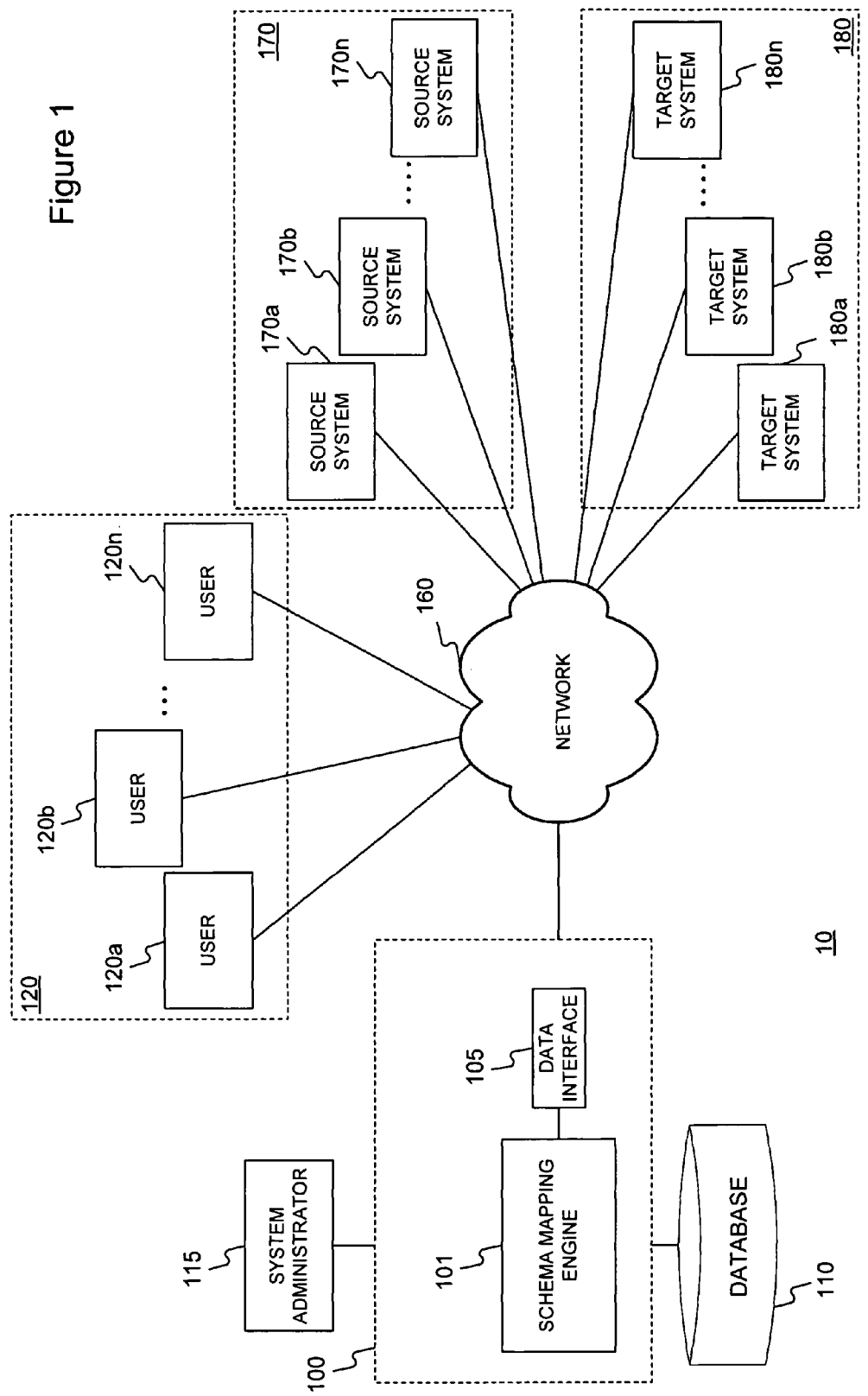
FIG. 1 illustrates a block diagram of an exemplary system configuration for implementing embodiments consistent with the principles of the present invention.

Reference will now be made in detail to embodiments of the invention, examples of which are illustrated in the accompanying drawings. Wherever possible, the same reference numbers will be used throughout the drawings to refer to the same or like parts.

Embodiments consistent with the present invention relate to systems and methods for schema mapping and transformation of data on the basis of layout and/or markup. Embodiments consistent with the invention further relate to systems and methods for schema mapping and data transformation of a source schema to a target schema.

The following definitions and explanations are intended to facilitate the understanding of the present invention without limiting its scope:

Extensible Markup Language (XML): XML is a standard format used to describe semi-structured documents and data. XML "tags" are embedded within the informational content of the document. When the XML document is subsequently transmitted between computer systems, the tags are used to parse and interpret the document by the receiving system. XML is an application of SGML.

Standard Generalized Markup Language (SGML): SGML is a generic language for writing markup languages. SGML makes possible different presentations of the same information by defining the general structure and elements of a document. XML and HTML (Hypertext Markup Language) are based on SGML.

XML Schema Definition (XSD): An XSD is an instance of an XML schema written in XML Schema language. An XSD defines a type of XML document in terms of constraints upon what elements and attributes may appear, their relationship to each other, what types of data may be in them, and other information. XSD may be used with validation software to ascertain whether a particular XML document is of that type, and to produce a post-schema validation information set.

Schema: Schema defines the structure, format, and type of contents of constituent structures of a document, e.g., a relational database, one or more XML files, one or more data files, and the like.

Document: a unit of information that contains plain, formatted, and/or structured text, schema and markup for structuring and formatting the text, graphics, sound, multimedia data, hyperlinks to other documents, and/or other contents. A document may be an instance of a schema. A document may also be referred to as a file. For example, a document may be a relational database, one or more XML files, one or more data files, a set of data, a data structure, and the like.

Content: Content is the values of elements or attributes of a document elements.

Markup: Structural information stored in the same document as the content of the document. Markup describes the structure and appearance of a document. In a document, if content is one level of information, markup is a second level, providing information about the content. Examples of markup include: element names, font attributes (e.g., type, size, color), placement on the page (e.g., left flush, right flush, centered), tables, images, hyperlinks, and formulas. Some markup languages (e.g., hypertext markup language, LaTeX, XML, and the like) may be directly edited in a text editor, while others are more easily edited in a program (such as Microsoft Word®). Different markup languages are designed for different purposes: Word for printable documents, papers, letters, and the like; HTML for web pages, links, images, and the like; LaTeX for formulas, research papers, data presentation, and the like.

Layout: The arrangement of text, graphics, sound, multimedia data, hyperlinks to other documents, and/or other contents within a document on a display (e.g., paper, electronic screen, and the like). A layout may arrange contents of the document on the display in accordance to the markup associated with the document.

Node: An element, or object that is part of a tree, and that is connected to other nodes by arcs.

Leaf: Refers to a terminal node of a tree or a node with no child/daughter.

Instance: In object-oriented technology, a member of a class. For example, "SAP" is an instance of the class "corporation." The term "instance" is used to refer to a document that is a member of the class of documents defined by a particular schema. Such a document is said to be an instance of the schema.

Path: The sequence of nodes encountered in the route between any two nodes (inclusive).

Resource Description Framework (RDF): RDF is a family of specifications for a metadata model that is often implemented as an application of XML. The RDF metadata model is based upon the idea of making statements about resources in the form of a subject-predicate-object expression, called a triple in RDF terminology. The subject is the resource, the "thing" being described. The predicate is a trait or aspect about that resource, and often expresses a relationship between the subject and the object. The object is the object of the relationship or value of that trait.

XML Path Language (XPath): XPath is a language that describes a way to locate and process items in XML documents by using an addressing syntax based on a path through the document's logical structure or hierarchy. XPath uses a terse, non-XML, syntax for addressing portions of an XML document.

Web Ontology Language (OWL): OWL is a language for publishing and sharing ontologies on the Internet. OWL extends the vocabulary of RDF, and currently has three variations: OWL Lite, OWL DL, and OWL Full. These variations incorporate different features, for example, OWL Lite and OWL DL are constructed in such a way that every statement can be decided in finite time, while this might not be true of OWL Full.

Tree: A hierarchical structure made up of nodes. Nodes are connected by edges from one node (parent) to another (child). A single node at apex of the tree is known as the root node, while the terminus of a path in the opposite direction is a leaf.

Exemplary System Configuration

FIG. 1 is a block diagram of an exemplary system configuration 10 for implementing embodiments consistent with the principles of the present invention. System 10 may facilitate schema mapping and data transformation. For example, the components of system 10 may be adapted to allow a user to visually map schema and transform data on the basis of layout markup and content. Further, one or more interfaces may be provided in system 10 to enable end users 120a-n to define or modify mappings between schemas.

As shown in FIG. 1, system 10 includes a server 100 with a schema mapping engine 101 and, optionally, a data interface 105. Server 100 is connected to a database 110 for storing data, such as source schema received from a plurality of source systems 170a-170n, target schema received from a plurality of target systems 180a-180n, as well as conceptual models, data representing various schema mapping (e.g., forward mapping data and reverse mapping data), and/or other input provided from users 120a-120n. Data from source systems 170a-170n, target systems 180a-180n, and authorized users 120a-120n may be sent to server 100 via a network 160. Each of these components is described in greater detail below.

As will be appreciated by those skilled in the art, the number and orientation of the components illustrated in FIG. 1 are merely are examples and do not limit the scope of the invention. For example, source systems and target systems may be replaced by a database, a server or memory storage device (e.g., a disk, a memory stick or other types of RAM, and the like) for storing and loading one or more source schemas and target schemas, as well as source data and target data. The loading of schemas and/or data may be achieved via network 160 or directly via, for example, a disk drive or file transfer. In one embodiment, the database, server or memory storage device is implemented as a component or integral part of server 100. Therefore, as can be seen, other arrangements and sets of components are feasible, consistent with the principles of the invention. Further, it is noted that any combination of the components in system 10 may be owned and operated by an institution or entity. Moreover, several of the components (such as source systems 170a-170n, target systems 180a-180n, and server 100) may by owned and operated by a third party for the purposes of providing schemas, conceptual models, mapping data and/or otherwise facilitating a user to visually map two or more schemas and transform data.

Source systems 170a-170n may provide source schemas and/or source data. Examples of source schemas that may be provided by source systems 170a-170n include source schemas related to a purchase order, such as a purchase order schema 550 (see FIG. 5A). Other examples of source schemas include source schemas related to a stock quote or other business objects. The source schema and/or source data from source systems 170a-170n may be sent to server 100 on a periodic basis (e.g., daily) or as requested by a user 120. All source schema and source data provided by source systems 170a-170n may be stored in database 110. Examples of source systems include commercially available sources of data, such as Bloomberg, Reuters, Associated Press, and the like. Examples of source systems further include other data sources, such as an equipment supplier, an equipment distributor, and the like.

Target systems 180a-180n may provide target schemas and/or target data. The target schema and/or target data from target systems 180a-180n may be sent to server 100 on a periodic basis (e.g., daily) or as requested by user 120. Examples of target schemas include target schemas related to a purchase order, such as a purchase order schema 580 (see FIG. 5B). Other examples of target schemas include target schemas related to a stock quote or other business objects. All target schema and target data provided by target systems 180a-180n may be stored in database 110.

Users 120a-120n represent authorized end users of system 10. As shown in FIG. 1, users 120a-n may be connected to server 100 via network 160, or may be directly connected to server 100 without utilizing network 160 (not shown). Access rights and privileges of each authorized user may be controlled by a system administrator 115. Conventional security models and techniques may be used for granting access rights and privileges to users 120a-120n. As further disclosed herein, the rights and privileges of each user may enable the user to retrieve, modify, and/or update source schemas, source instances, target schemas, and target instances stored in database 110, as well as generate, retrieve, update, and/or modify data mappings between source schemas and/or target schemas using schema mapping engine 101 in server 100.

In operation, server 100 receives data from the various data sources in system 10 (i.e., users 120a-120n, source systems 170a-170n, and target systems 180a-180n). In one embodiment, the received data may be filtered, mapped and/or otherwise processed prior to analysis by schema mapping engine 101 or storage in database 110. For example, a data interface 105 may be provided to filter and map data from source systems 170a-170n and/or target systems 180a-180n. Such processing may normalize the data, catch exceptions or errors, or execute other relevant processing on the data.

The components shown in FIG. 1, including server 100, database 110, a system administrator 115, users 120a-120n, source systems 170a-170n, and target systems 180a-180n, may comprise a computing device or platform, such as a computer, laptop, server, mainframe and the like. By way of example, such a computing device may include a central processing unit (CPU), a disk drive, a memory, and/or a network access device. Further, server 100 may be embodied as a central server (as represented in FIG. 1) or any number of distributed servers (not shown), and may comprise software applications or modules for implementing schema mapping engine 101 and data interface 105.

The CPU of a computing device may be any appropriate processor or set of processors for executing program instructions. Memory may be RAM or any another permanent, semi-permanent, or temporary storage device, including ROM and flash memory. Disk drives may comprise a hard disk drive, an optical drive, or any other type of data storage device.

The network access device of a computing device may be a modem, a cable modem, an Ethernet card, a T1 line connector, or any other access device for connecting a respective system component (e.g., server 100, database 110, system administrator 115, users 120, source systems 170, target systems 180) to another system component or connecting a respective system component directly to network 160. Network 160 may be any combination of wired or wireless networks for facilitating the electronic communication of data. By way of example, network 160 may comprise a private network, such as a local area network (LAN), or a wide area network (WAN), and/or a public network, such as the Internet. Further, conventional protocols and encryption methods may be utilized for electronically transmitting data over network 160. For example, http or ftp protocols may be used for data transfers, and encryption may be achieved through secure ftp or secure copy.

Although not shown, each of the computing devices in FIG. 1 may be connected to one or more input devices, such as a keyboard, a mouse, or some other type of means for inputting data to computing device. Further, each of the computing devices may be connected to one or more display devices, such as a monitor or any other visual and/or audio-visual output device.

In the example of FIG. 1, server 100 receives data from source systems 170a-170n and target systems 180a-180n, and communicates with database 110 to retrieve and store data. For this purpose, database 110 may comprise any conventional database management system. Examples include, but are not limited to, an Oracle®) relational database management system, a Microsoft® SQL Server, and Sybase®. In one embodiment, database 110 is configure to perform various functions, such as data retrieval or calculations.

System administrator 115 may have various administrative responsibilities over system 10, such as maintaining the processing capabilities and/or other options in data interface 105, maintaining the data stored in database 110, and maintaining access rights and privileges of users. System administer 115 may also access system 10 as a user. System administrator 115 may also administer source and target data, including identifying data issues or errors and communicating with the source systems 170a-n and target systems 180a-180n to resolve data issues or errors.

Direct Data Mapping Process

Figure 4:
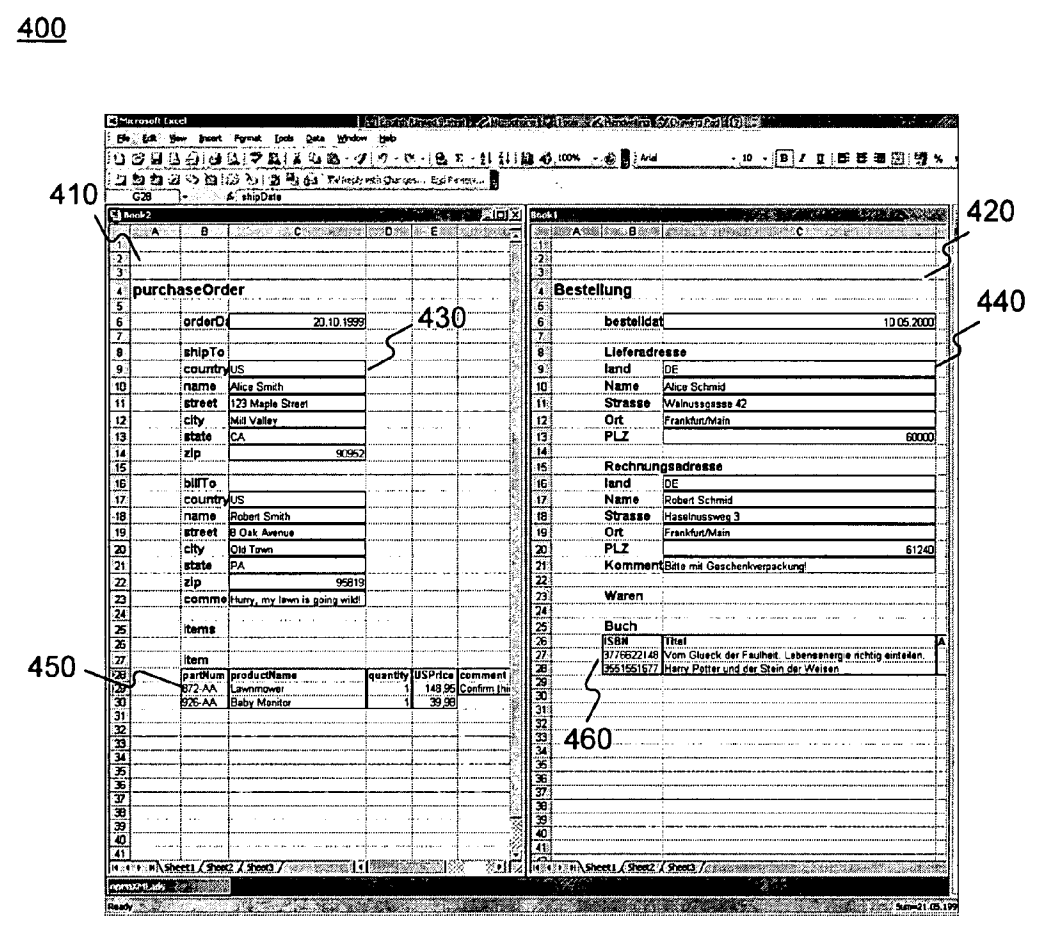

In accordance with an embodiment of the invention, the user may directly map between an instance of the source schema and an instance of the target schema by working directly with a pair of instances that have been laid out side-by-side as shown in FIG. 4. In particular, FIG. 4 shows an exemplary user interface 400 for direct mapping of schema and transformation of data. A source representation 410 on the left side of the user interface is based on an instance of the source schema (e.g., source schema 550), and a target representation 420 on the right side of the user interface is based on an instance of the target schema (e.g., target schema 580). Source representation 410 may be created by laying out the content of the source instance according to the source schema, including labels (e.g., "orderDate," "shipTo," "country," etc., as illustrated in source representation 410), elements, attributes, and the values of elements and attributes (e.g., country 430, item 450, etc.). Target representation 420 may be created by laying out the content of the target instance according to the target schema, including labels (e.g., "bestelldat," "Lieferaddress," "land," etc., as illustrated in target representation 420), elements, attributes, and the values of elements and attributes (e.g., target slots 440 and 460, etc.).

FIGS. 5A and 5B illustrate exemplary schemas written in XML Schema language. Source schema 550 is an instance of an XML schema written in XML Schema language. Likewise, target schema 580 is an instance of an XML schema written in XML Schema language. Source schema 550 and target schema 580 each define a type of XML document (e.g., purchaseOrder 250) in terms of constraints upon what elements and attributes may appear, their relationship to each other, what types of data may be in them, and other information. Source schema 550 and target schema 580 may each be used with validation software to ascertain whether a particular XML document (e.g., purchaseOrder 250) is of that type, and to produce a post-schema validation information set.

Figure 2A:
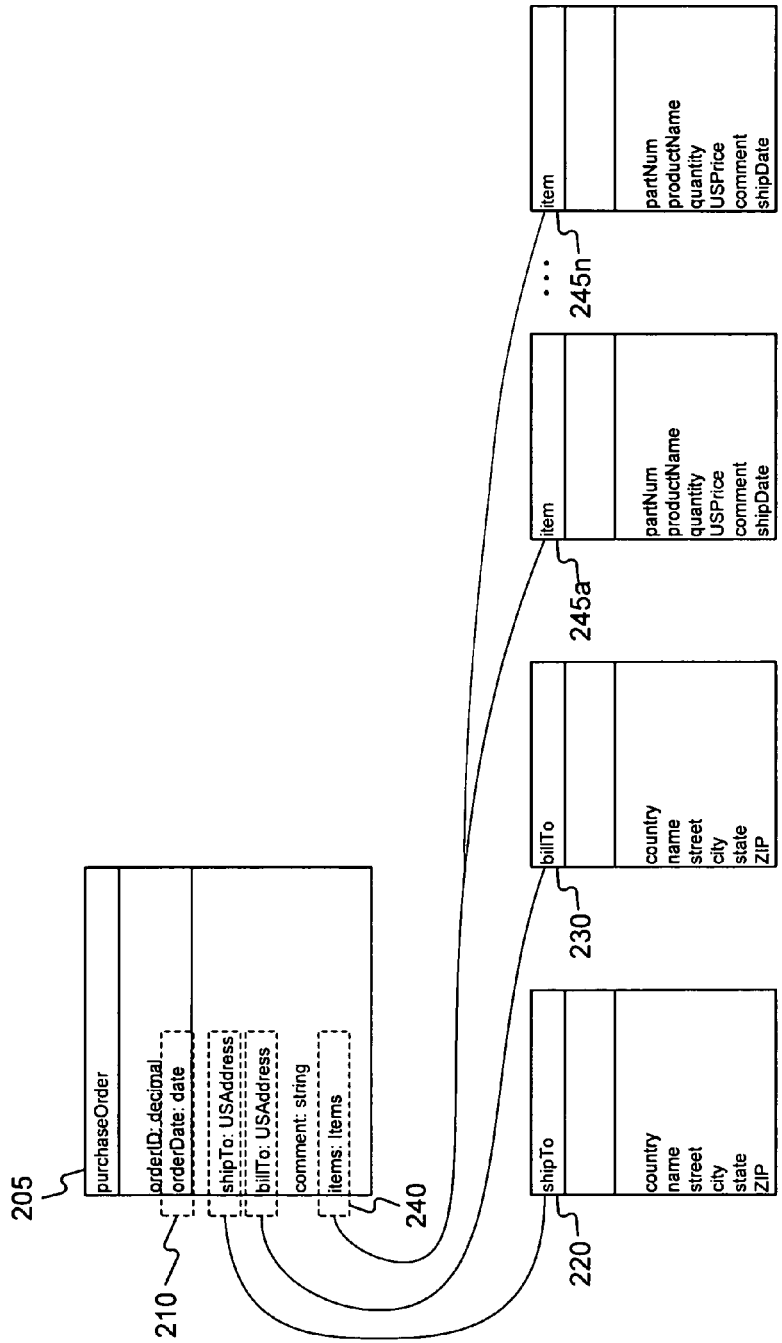
FIGS. 2A-2C show exemplary representations of a data model for schema mapping and the transformation of data.
Figure 2B:
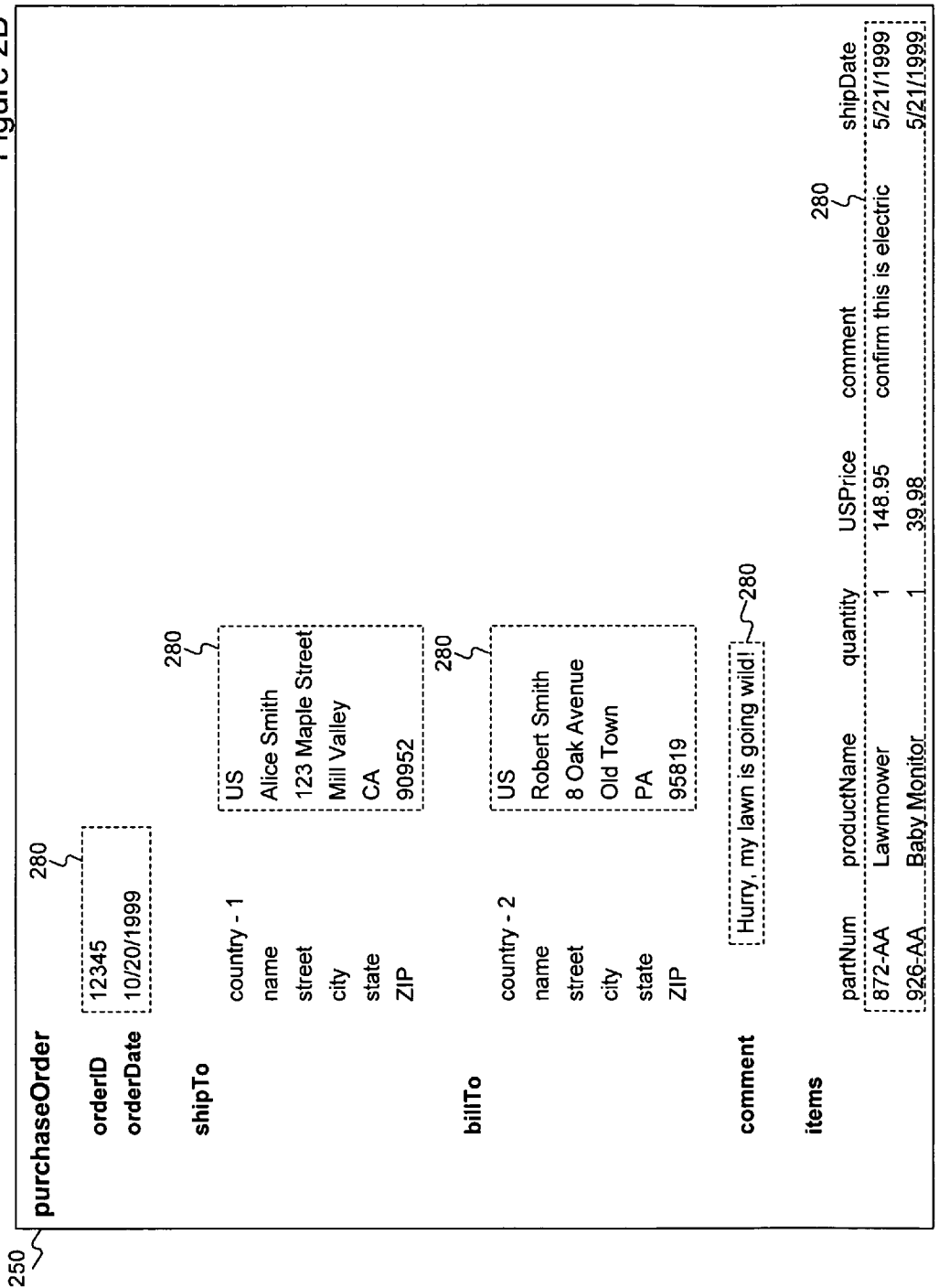
Figure 2C:
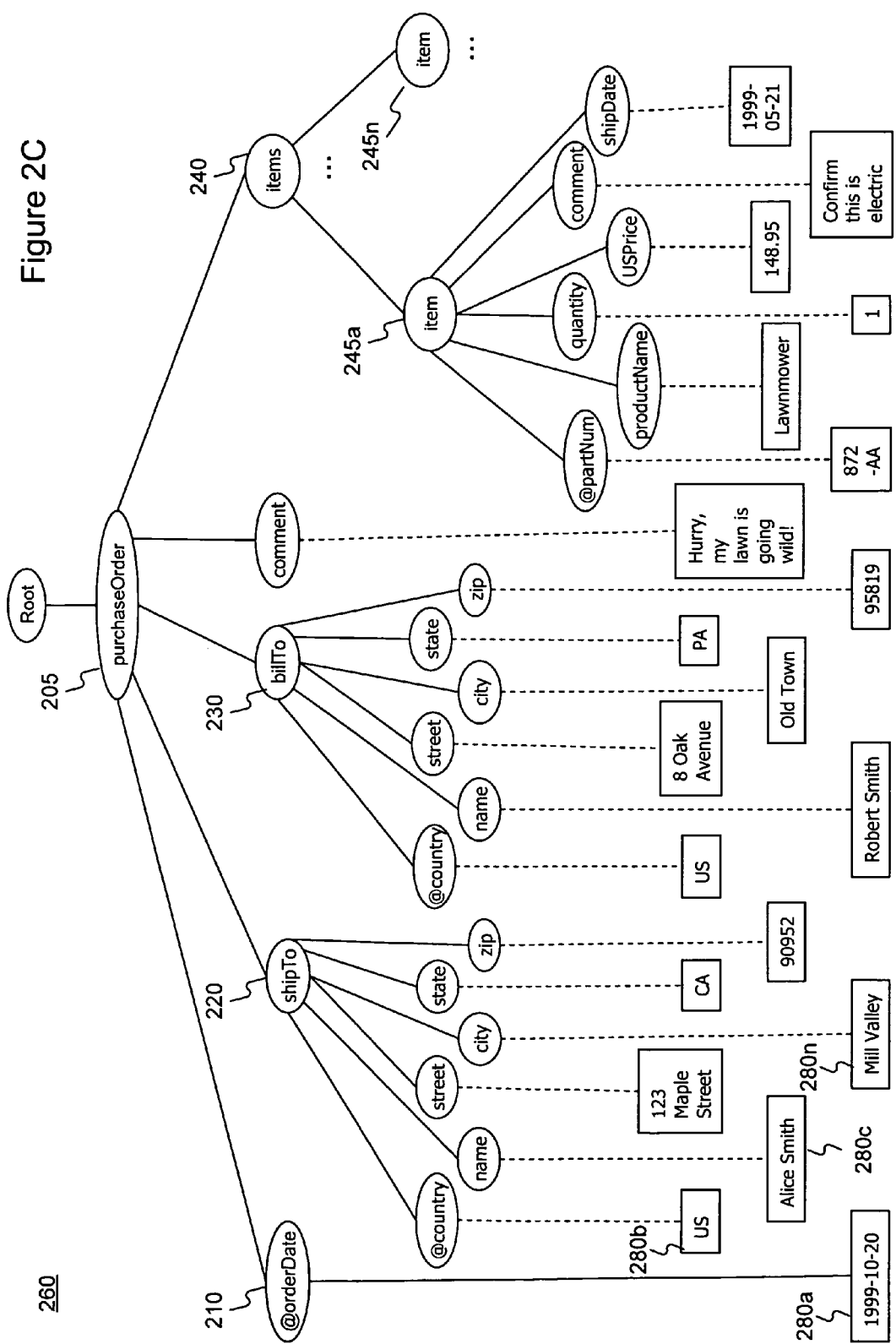

FIG. 2B is an exemplary layout of an instance of a schema 550 (represented in XSD as illustrated in FIG. 5A and as a tree 260 in FIG. 2C). The representation of the schema instance (e.g., representation 250, source representation 410) is created by laying out the content of the instance according to the tree structure of the instance, the tree structure including elements, attributes, and the values of elements and attributes. Values are the leaf elements of the tree. The representation shows the content and tree structure of the instance. Alternative forms of representation are possible. The user may display schema annotation (if provided) to help the user decipher the meaning of elements, attributes and their values.

The layout includes labels for all values represented. These labels are the element or attributes names from the instance, e.g., purchaseOrder 205, @orderDate 210, shipTo 220, billTo 230, items 240, item 245a-n, etc., as illustrated in FIG. 2A, and partNum, productName, quantity, USPrice, comment, shipDate, etc., as illustrated in FIG. 2B. If labels are not sufficiently descriptive of the meaning of the values, the user can edit them to assign a display label. The original labels are maintained and may be restored or displayed if required. Re-labeling is useful when the labels are not very informative, e.g., have names like 'E241'. The user may also format labels and move both the labels and values around as desired. The user may also add labels and values. Moreover, in situations where two or more elements in an instance are labeled with the same name (e.g., shipto country and billTo country in representation 250), server 100 may re-label the elements to differentiate the elements and to simplify mapping formula generation. For example, server 100 may add a number to the label to make it unique (e.g., "country—1," "country—2," etc.). All these changes may be saved with the mapping and may be used as layout for other instances of the same schema.

Labels may appear as pairs in the order they appear in the instance. Because attributes (e.g., @orderDate 210) are subordinate to an element, each of the attributes may appear as a label-value pair near the element qualified by the attribute. The label-value pair may be presented in a format that shows which element the attributes qualify. Labels may be also presented in a way that makes them easy to distinguish element values from attribute values.

If there are repeating elements, server 100 may represent only as many elements as necessary to enable the user to create the mapping between the source and target. For example, if there are no optional sub-elements or optional attributes in the element, only one element is represented. However, the representation may indicate to the user that the element does appear more times in the instance. If desired, server 100 may display more of the repetitions. Server 100 may record which elements are repeating.

The purpose of schema mapping is to specify how to calculate values for the target schema as a function of values in the source schema. In some cases, target values or values from external functions (e.g., remote functions and methods, web services, and the like) may also be needed to calculate target values. The user specifies how to calculate a target value by creating a mapping formula in the field that contains the target value. In an exemplary embodiment implemented using a spreadsheet, the mapping formula used to calculate a target value in cell C9 of Book1 (FIG. 4, target slot 440) from a source value in cell C9 of Book2 (FIG. 4, source slot 430) may be book1!c9=copy(book2!c9). When this formula is saved, the cell references may be converted to, or associated with, the XPaths for the respective values, e.g. /Bestellung/@bestellidatum=copy (/purchaseOrder/@orderDate). These paths may be used to execute a transformation of an instance of the source schema into an instance of the target schema.

Consistent with an aspect of the invention, if server 100 has no prior layout for a type of instance, server 100 assigns values and corresponding labels to elements and attributes (e.g., purchaseOrder 205, shipTo 220, billTo 230, items 240, item 245*a-n*, and the like) so that they appear as pairs in the order they appear in the instance. Because attributes (e.g., @orderDate 210) are subordinate to an element, attributes appear as a label-value pair near the element they qualify, and in such a way that it is clear which element they qualify. They can be represented in a way that makes it easy to distinguish element values from attribute values.

If there are repeating elements, server 100 may create only as many instances as necessary to create the represented mapping. For example, if there are no optional sub-element or optional attributes in the element, only one instance is represented. However, the representation may indicate to the user that the element does appear more times in the instance. If desired, server 100 may display more of the repetitions. Server 100 may record which elements are repeating. When server 100 transforms an instance of a source schema into an instance of the target schema, server 100 may generate a loop and create an element or set of elements in the target instance for each repeated element in the source instance. As a mapping rule, this may be represented as follows:

Formula 1: Transforming repeating elements:

$$t_1[x] = f_1(s_i[x] \ldots s_j[x], s_k)$$

For Formula 1: $t_1$ identifies the target value being calculated, $f_1$ identifies the name of the formula used to calculate the target value. The s subscripts are the input values to the formula. When followed by brackets, the input is an entire list of repeated values. Server 100 may input a list of all values for those source values (e.g., $s_i[]$, $s_j[]$, and the like) into Formula 1. During transformation, Formula 1 is interpreted to indicate that the number of target values (e.g., target values of an instance of the conceptual model) to create is the number of repetitions of source values in the source instance. One target value is calculated for each set of source values. Source values may be used in the order they appear in the instance to create each successive target value. All the source parameters with [x] must be from the same repetition. Other values from non-repeating elements may also be used to calculate the target value. In addition, a specific repeating element specified by explicit number is allowed. Server 100 may enforce such restrictions. Server 100 is capable of handling nested repetitions. For example, server 100 may calculate a target value like /Order/Item[1]/Delivery[1], /Order/Item[1]/Delivery[2], and the like. The source values for calculating these values may be obtained from same repetition sets of the repeating elements, or from explicitly named source values.

An additional mapping rule for transforming the source instance having repeating elements to the instance of the target schema may calculate one target value based on a set of repeated source values. This mapping rule may be represented as follows:

Formula 2: Calculating a target value based on repeating elements $$t_2 = f_2(s_i[], \ldots, s_j[], s_k)$$

For Formula 2: $t_2$ identifies the target value being calculated, $f_2$ identifies the name of the formula used to calculate the target value. The s subscripts are the input values to the formula. When followed by brackets, the input is an entire list of repeated values. Server 100 may input a list of all values for those source values (e.g., $s_i[]$, $s_j[]$, and the like) into Formula 2. Server 100 may, for example, use a formula $t_2 = \text{sum}(s_i[])$, where $s_i$ contains an XPath "/purchaseOrder/Items/item[]/USPrice", to sum all U.S. prices listed in items of a purchaseOrder to create a total price. If necessary, server 100 may be extended to enable alternative methods for addressing collections of values that are used as the input to a formula to calculate a target value.

Values (e.g., element or attribute values 280) are the leaves of the instance tree. Server 100 may show the structure of the instance as a nested display, in which each element is enclosed in a box and the boxes are nested to show the structure. An alternative is to not show the structure except upon request by the user. Using a context-sensitive menu, the path associated with the value at the current position may be shown. The path can be displayed as a simple list of element or attribute names separated by a forward-slash sign. The user may modify the representation created by the layout process. The user may add or modify text and may use text formatting functions, e.g., font size, font color, font style, and the like. Any modifications made may be saved in the repository (e.g., database 110) and used the next time an instance of the same schema is loaded into server 100.

Figure 3:
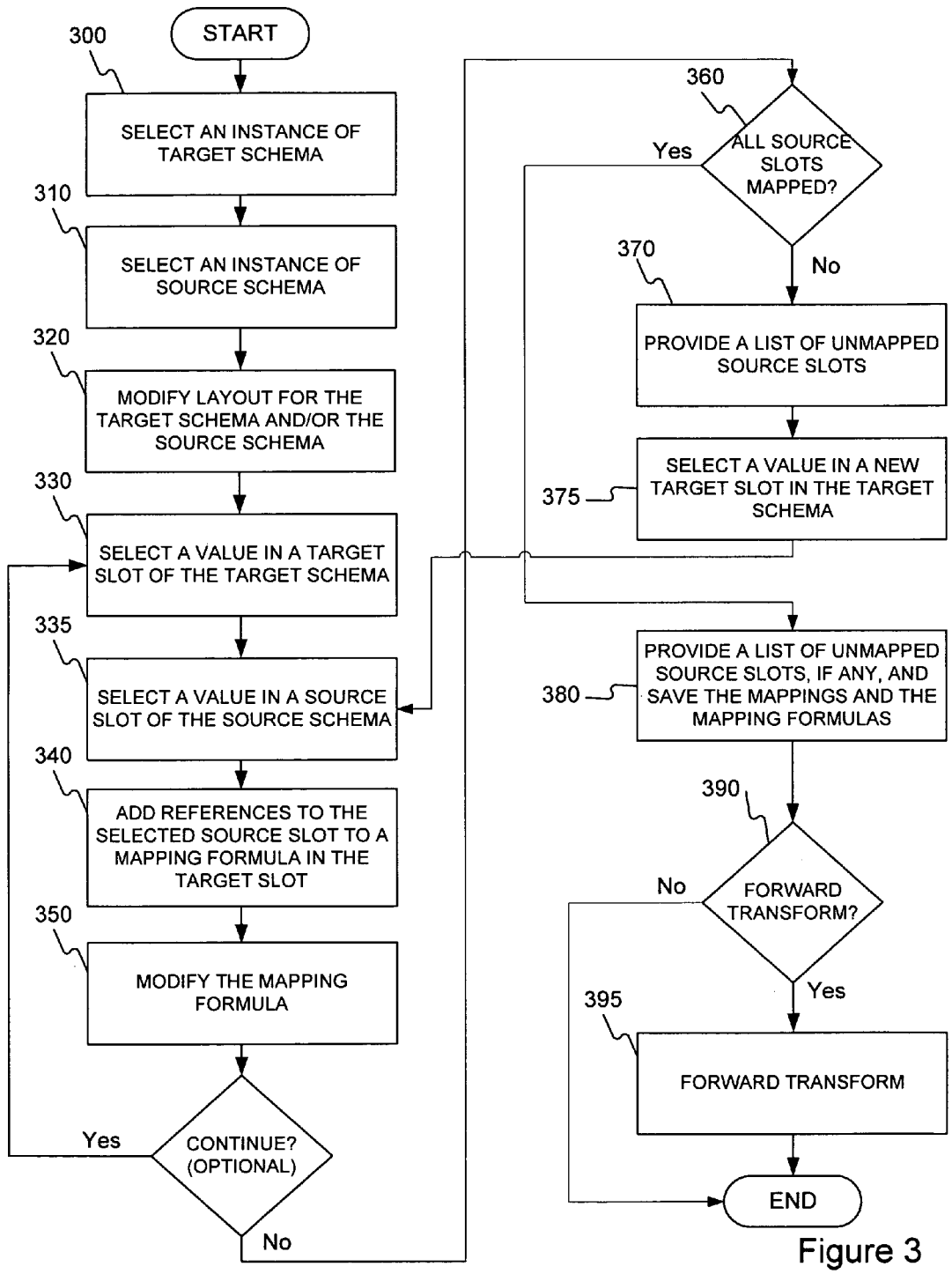
FIG. 3 shows a flow diagram of an exemplary process for schema mapping and the transformation of data, consistent with an embodiment of the invention.

FIG. 3 shows a flow diagram of an exemplary process for schema mapping and the transformation of data, consistent with an embodiment of the invention. For purposes of illustration, FIG. 3 will be described with reference to the exemplary system of FIG. 1. It will be appreciated, however, that the exemplary method may be implemented with other systems, consistent with the principles of the invention. Further, it will be appreciated that the various displays of data and collection of data described below may be supported by a graphical user interface (GUI) and/or other suitable user interfaces. The exemplary process enables the user to immediately see and correct the results of the mappings being defined.

Consistent with an embodiment of the invention, an overview of the steps for mapping from a source schema to a target schema is provided below. At any point during the mapping process, if a user (e.g., one of the users 120) elects to save his or her mapping and/or exit from the mapping process, the mapping process may jump to step 380. If the user elects to save the mappings, the mappings are saved for future use, e.g., they can be applied to other instances of the same schema.

In step 300, the user selects an instance of the target schema. Server 100 loads the selected target instance, and displays a representation of the target instance in a target window to the user, including the target instance's elements, attributes, and the values of the elements and attributes. Next, in step 310, the user selects an instance of the source schema (e.g., an XML schema file). Server 100 loads the selected source instance, and displays source representation 410 of the source instance in a source window to the user. If a target instance does not exist, server 100 may allow the user to create new instances based on the target schema, if needed, or to extend existing instances of the target schema. Likewise, if a source instance does not exist, server 100 may permit the user to create new instances based on the source schema, if needed, or to extend existing instances of the source schema. Server 100 may create a form in which the user can enter values for leaf elements. This form may appear similar to the user interface (e.g., user interface 400), except that some slots for target values (e.g., target slots 440 and 460, source slots 430 and 450) are blank, because there are no values for them in the instance, either because there is no instance, or the current instance has no values for those elements or attributes.

To extend the instance or create a new instance, the user may enter values in the blank slots. These values may be checked for consistency with the constraints expressed by the schema (e.g., source schema 550, target schema 580). This procedure can be performed on the source or target instances, and the entered information may be saved in a repository (e.g., database 110).

Source and target representations (e.g., source representation 410, target representation 420) may be created automatically by server 100 using a layout algorithm that determines where to display values and labels for elements and/or attributes on a computer screen. Server 100 may also create a layout for the instances, if one does not already exist in the database. In step 320, the user may modify the layout for either the instance. This enables the user to modify labels or layout to make the layout easier to comprehend.

Next, the user maps the source instance to the target instance, a process referred to herein as "forward mapping." In one embodiment consistent with the invention, the user may map the source to the target in a top-down manner, i.e., starting with the top-level element in the target. Server 100 may provide automated mapping suggestion(s) to the user. These can be either generic (unspecified) mapping formulas with source values as parameters or, in some cases, specific mapping formulas. The automated suggestions may be based on the source or target schema, and/or previous mappings, either from a repository (e.g., database 110) or current work of the user. For example, if the source schema has a complex type called Address, and the user maps its sub-elements to the sub-elements of the target complex-type PostalAddress, then server 100 searches for other elements of type Address and creates suggestions to map them to other unmapped PostalAddress targets.

Automated suggestions may be prioritized by applying matching algorithms to compute the degree of match between pairs of elements for the source and target. Matching may be based on such features as similarity of names, complex types, annotation, attributes and other relations. The automated suggestions may be included in the target slot (the slot is the place where the target value is displayed in the representation) as a drop-down list, ordered from most likely to least likely. For example, if there are three Address elements and three PostalAddress elements, each of the unmapped PostalAddress elements will have a drop-down list with two entries.

Standard existing matching algorithms may be used to provide automated suggestions. By way of example, a matching algorithm is described in H. Do and E. Rahm, "COMA—A System for Flexible Combination of Schema Matching Approaches," published 2002 by VLDB, the entire contents of which are expressly incorporated herein by reference.

Server 100 may use the matching algorithm(s) to create an initial list of prioritized mapping suggestions for the target values of the top level elements, e.g., the direct leaves of purchaseOrder element 205. In an exemplary embodiment consistent with the invention, as the user continues to map the source values to the target values (e.g., by specifying formulas in target slots to calculate the target values based on source values from one or more source slots), server 100 updates the suggestions that appear in the drop-down lists in the target slots. For example, after the user maps a sub-element or attribute of an element of the source schema instance to a target element, server 100 applies the matching algorithm(s) to the remaining sub-elements or attribute of the matched elements to try to match those. For example, if partNum 450 (see FIG. 4) of "item" element is mapped to ISBN 460 (see FIG. 4) of "Buch" element, server 100 may find the best matches between the remaining sub-elements of "items" with all the other sub-elements of "Buch." Matches above a user-specified level of probability of being correct are gathered together and made into the parameters of an abstract formula that is placed in the list of suggestions to be displayed in the target slot. This process is successive, after the user completes the entry of a formula in a target slot, server 100 may attempt to match target and source elements and attributes and create suggestions for insertion in the drop-down lists in target slots. As another option the user can indicate to the system that a source element and a target element (e.g., item and Buch) should match up. The system will then calculate suggestions for matching the sub-elements of those.

In step 330, the user may select a target value (e.g., value in target slot 440) in the target window. Then, in step 335, the user may select one or more source values (e.g., value in source slot 430) in the source window that match the selected target value in the target window. For example, the target value in the selected target slot may be calculated from one source value or multiple source values. Alternatively, if server 100 has provided automated suggestions, the user may choose or reject the automated mapping suggestions for the selected target slots. Source values, however, are not limited to values in the source representation. As further described below, one or more source values may be selected from values in target representation 420, one or more constants, or one or more externally computed values.

In one embodiment, some target values may be calculated based on other target values, e.g., one target value is calculated from a source value, and another target value is given the same value as the first target value, but rounded down. In this case, a dependency associated with the second target value indicates to server 100 that the second target value must be calculated after the first target value is calculated, and is said to depend on the first value. It is an error to have circular dependencies. Server 100 may detect this and issue a warning to the user.

In another embodiment, a target value may be calculated based on a set of other values. For example, by choosing a column of a table (sub-elements of a repeating element), the user indicates that the input to the target formula is the entire set of values from that column. This may be used, for example, to sum a column of numbers or to concatenate a column of source values with a separator character added between each of the source values. For example, server 100 may concatenate exemplary source values (in XML) to generate a target value (in XML) as shown below.

Source values:

```
<day>02</day>
<month>03</month>
<year>1947</year>
```

Target value:
<date>02/03/1947</date>

The target formula (which the user can see in the target slot if desired) for mapping the source values to the target value may be Date =concatenate ("/", Day, Month, Year). If desired, the user may also view the paths (e.g., XPaths) that correspond to the labels Day, Month, Year and Date.

In yet another embodiment, server 100 may determine the target value based on a label associated with the source value, rather than a source value. In this case, server 100 may rely on the source label to determine a value in the target instance. For example, server 100 may convert the "BuyerAddress" label in the source instance into a "buy" value for the "Role" element in the target instance, as shown below.

Source values:

```
<BuyerAddress>
    <City>Paris</City>
</BuyerAddress>
<SellerAddress>
    <City>New York</City>
</SellerAddress>
```

Target values:

```
<Address>
    <Role>buy</Role>
    <City>Paris</City>
</Address>
<Address>
    <Role>sell</Role>
    <City>New York</City>
</Address>
```

Target formula for the Role element may be "[if BuyerAddress] then Role='buy' and City=BuyerAddress/City; [if SellerAddress] then Role='self and City=SellerAddress/City", i.e., if the 'BuyerAddress' element is encountered in the source instance, then the target value for Role is 'buy' and City is 'Paris', and if the SellerAddress element is encountered in the source instance, then the target value for Role is 'sell' and City is 'New York'. Server 100 may provide support to create this type of formula. For example, the Role element might allow, as possible values, an enumerated list of values, e.g. {buy, sell, manufacture, ship . . . }, which are usually found in the schema. The user may fill in a slot for Role by choosing one of the enumerated values, e.g., 'buy'. Then the user can fill in the City by using a target formula like copy (BuyerAddressCity/City).

Server 100 may also determine the target structure (e.g., tags or labels) predicated on one or more source values. For example, server 100 may generate a 'BuyerAddress' element in the target instance based on a source value of 'buy' in a 'Role' element in the source instance, as shown below.

Source values:

```
<Address>
    <Role>buy</Role>
    <City>Paris</City>
</Address>
<Address>
    <Role>sell</Role>
    <City>New York</City>
</Address>
```

Target values:

```
<BuyerAddress>
    <City>Paris</City>
</BuyerAddress>
<SellerAddress>
    <City>New York</City>
</SellerAddress>
```

A target formula for BuyerAddress/City may be "BuyerAddress/City=select_value (City, Role, 'buy')", and a target formula for SellerAddress/City may be "SellerAddress/City=select_value (City, Role, 'sell')," i.e., if Address/Role in the source instance="buy", then insert a 'BuyerAddress element in the target instance and set BuyerAddress/City=Address/City, and if Address/Role in the source instance="sell", then insert a 'SellerAddress element in the target instance and set SellerAddress/City=Address/City. The "select_value" function indicates that server 100 should select the value of City that is associated with the given Role value.

Next, in step 340, server 100 adds the references to the selected source slot or slots to a mapping formula in the target slot. Depending on configuration options, the original example value of the target slot may be made invisible or displayed above the target slot when performing, for example, a mouse-over.

In step 350, the user may modify the mapping formula in the target slot to calculate the value of the target slot as a function of the source value(s). The mapping formula may also use any constants created by the user and stored in slots in the source instance. Server 100 displays the result of the mapping formula in the target slot, thus allowing the user to verify that the forward mapping (forward mapping means from the source to the target) has been correctly performed. The user may repeat steps 330-350 to map other source slots to the correct target slots until every applicable target slot has a mapping formula. This process enables the user to see the results of the mapping in real-time as the user specifies how to calculate values in the target slots based on other values, usually source values, but target values, constants, or externally computed values may also be used. Any source or target slots that are not applicable may be hidden from view to keep display 400 simpler and less cluttered.

If server 100 determines in stage 360 that not all source values have been mapped, then server 100 may provide a list of unmapped source slots and alert the user at step 370. In one embodiment, the user may cycle through the unmapped source slots to determine if they need to be mapped. If the user determines that any of the unmapped source values do not need to be mapped, the user may mark them as "do not need to map." This information may be recorded in a repository, (e.g., database 110). In stage 375, the user may select a target slot and, after the user selects a target slot, the mapping process may return to step 335, as shown in FIG. 3.

If, in stage 360, server 100 determines that all source slots in have been mapped to one or more target values, then server 100 may save the mappings between the source and target instances at stage 380. The user may also add information about the context in which the mappings are applicable. For example, for one or more of the mappings, the user may enter context attributes, such as partners, systems, industries, and processes involved in a transaction, etc. If no context is given, the mappings may be assumed to be generally applicable. This mapping information may be recorded in a repository (e.g., database 110), and may be used for generating automated suggestions. Next, in stage 390, server 100 may determine whether the user wishes to forward transform an instance of the source schema into an instance. If server 100 determines the user wish to forward transform, then the mapping process may proceed to stage 395. In stage 395, server 100 may forward transform, either automatically (via, for example, a trigger or a batch job) or in response to a request by the user, an instance of the source schema into an instance of the target schema based on the forward mapping. Alternatively, if server 100 determines the user does not wish to forward transform at stage 390, then the mapping process may terminate.

The mappings created are applicable to instances of the source schema that are subsets of the instance that was mapped. Usually, schemas are large, but instances use only a subset of the elements defined by the schema. If another instance that uses a different subset of the schema needs to be mapped to the target schema, then of the process of creating mappings between the source and target schemas continues by repeating the entire process for that source instance and a corresponding target instance. The elements that overlap between the two source instances will already have been mapped, so that when the source and target instances are loaded into the mapping editor, the applicable mappings are retrieved from a repository (e.g., database 110) and appear as work that has already been done. The user need only map the non-overlapping source values.

Forward Transformation Using Forward Data Mapping

Server 100 may execute the forward transformation by using the forward mapping information, which may contain a list of target elements or attributes (which may be in the form of target paths) associated with the transformation formula and its inputs, and the source elements or attributes (which may be in the form of source paths).

Exemplary forward mapping information $t_n$ may be represented as $t_1=f_a(s_i, s_k \ldots)$, $t_2=f_d(s_m, s_j \ldots)$, ..., $t_n=f_n(s_x, s_y \ldots)$, wherein 't' and 's' are paths, e.g., $s_i$ may be '/Order/BuyerParty/Party/PartyName/Name'. There may be one entry in the list for each target path on the left side of the equal sign. Each entry corresponds to one of the target values created during the forward mapping process. The entry is interpreted as an instruction to retrieve the value at the end of each source path, use these values as inputs to the formula, calculate the output value, create the target path if it does not already exist, and add the value to the end of the target path. In this way the instance of the target schema is constructed from the source instance. However, a source value in the source path may be missing because it is optional or because it is part of a choice and was not chosen. In these cases, all target values that depend on the missing source value may not be included or calculated unless server 100 can determine a default value for those target values.

When server 100 transforms an instance of a source schema into an instance of the target schema, server 100 may generate a loop and create an element or set of elements in the target schema for each repeated element in the source instance. As a mapping rule, this may be presented to the user as follows: book1!b27=copy (book2!b29). However, server 100 works with paths (e.g., XPaths) through the document, so the rule needs to be saved as, for example, /Bestellung/Waren/Buch[1]/@ISBN=copy (/purchaseOrder/Items/ltem[1]/@partNum.

When server 100 executes a transformation on a mapping, server 100 recognizes that this mapping might involve repeating elements. Therefore, it can create an output (target) element for each input (source) element. Moreover, such systems and methods need to support the actual transformation of instances of schemas to other instances of schemas on the basis of the created mappings, as well as the debugging of such transformations. Transformations may be many-to-many, that is, one instance of a schema may be transformed into a set of instances of other various schemas. Or, a set of instances of various schemas may be transformed and merged into one instance of a schema (e.g., one of the various schemas or a schema different from the various schemas).

Server 100 may execute transformations off-line or on-demand. Server 100 may also include a debugging system to debug problems during the transformations. For example, server 100 may receive, as input, the name of a source schema, the name of a target schema, and an instance of the source schema. Server 100 may search a database (e.g., database 110) to find schema mappings (transformation formulas) for the source and target schemas. The schema mappings are used to create a new instance of the target schema from the instance of the source schema. "Source" and "target" are relative terms, applicable in the context of the process of creating mappings and executing transformations. Mappings are created from a source to a target, and a transformation uses the mapping rules to create an instance of a target schema from an instance of the source schema. If server 100 detects problems or errors during forward transformation, e.g., the target instance does not conform to the target schema, server 100 alerts a system administrator, who may use a debugging tool to find the source of the problem. This debugging tool may use the same GUI as that used to create mappings.

Figure 6:
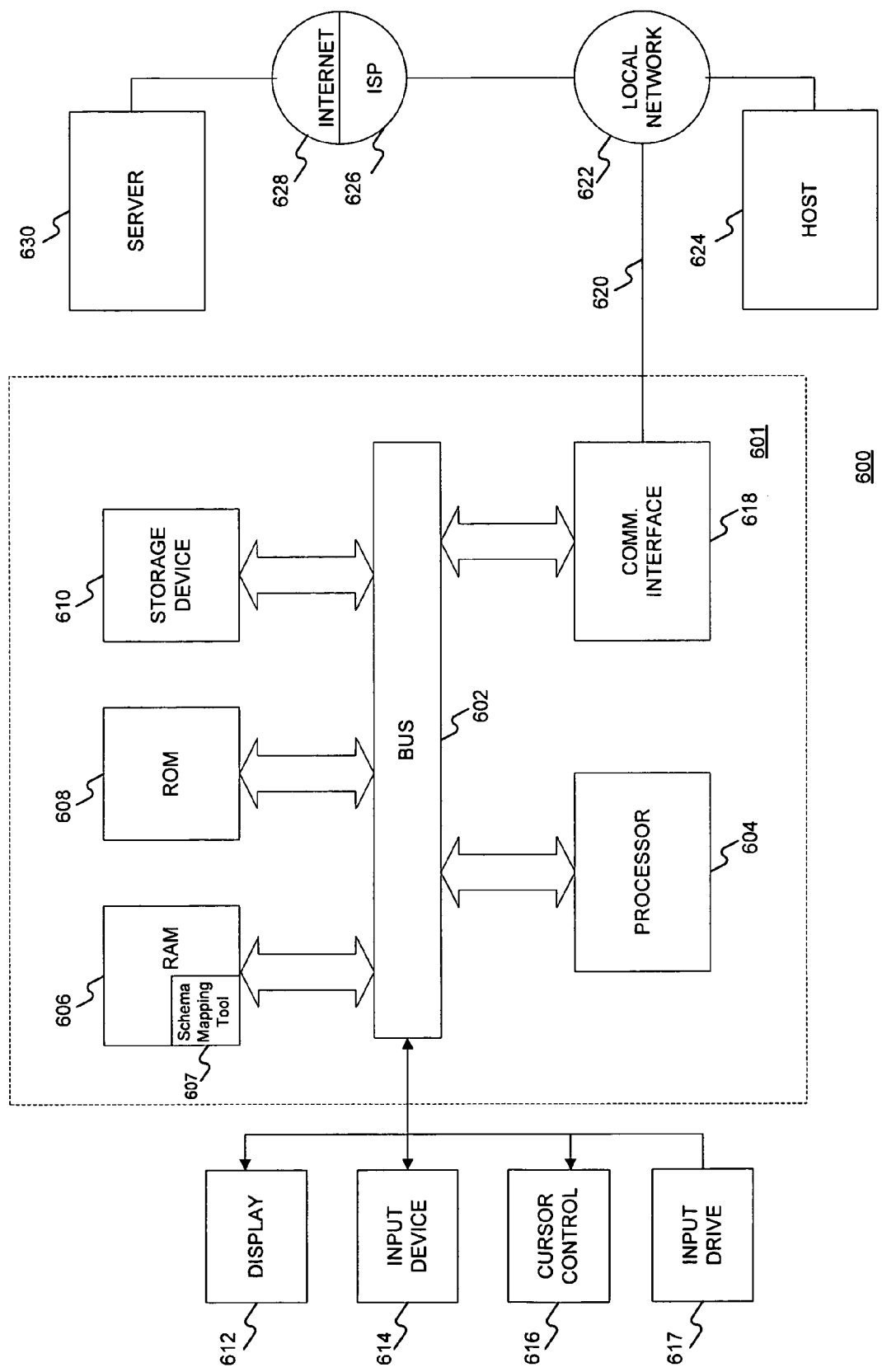
FIG. 6 shows a block diagram of an exemplary system for schema mapping and data transformation of electronic documents.

Systems and methods consistent with the present invention may be implemented by computers organized in a conventional distributed processing system architecture. FIG. 6 is a block diagram illustrating another exemplary computer system 600 in which embodiments consistent with the invention may be implemented. Computer system 600 includes a computer 601 having a bus 602 or other communication mechanism for communicating information, and a processor 604 coupled with bus 602 for processing information. Computer 601 also includes a main memory, such as random access memory (RAM) 606 or other dynamic storage device, coupled to bus 602 for storing information and instructions to be executed by processor 604. RAM 606 also may be used for storing temporary variables or other intermediate information during execution of instructions to be executed by processor 604. Computer 601 may further include a read only memory (ROM) 608 or other static storage device coupled to bus 602 for storing static information and instructions for processor 604. A storage device 610, such as a magnetic disk or optical disk, may be provided and coupled to bus 602 for storing information and instructions.

Computer 601 may be coupled via bus 602 to a display 612, such as a cathode ray tube (CRT), for displaying information to a computer user. An input device 614, such as a keyboard including alphanumeric and other keys, is coupled to bus 602 for communicating information and command selections to processor 604. Another type of user input device is cursor control 616, such as a mouse, a trackball or cursor direction keys for communicating direction information and command selections to processor 604 and for controlling cursor movement on display 612. This input device typically has two degrees of freedom in two axes, a first axis (e.g., x) and a second axis (e.g., y), which allow the device to specify positions in a plane. System 600 may further include an input drive device 617, such as a CD reader, for reading high-capacity computer-readable media, such as CD-ROMs and CDRs.

According to one implementation, systems and methods consistent with the present invention provide for the mapping of schema and transformation of data on the basis of layout and/or markup when processor 604 executes one or more sequences of instructions, such as schema mapping tool 607, contained in RAM 606. Such instructions may be read into RAM 606 from a computer-readable medium via an input device such as storage device 610. Execution of the sequences of instructions contained in main memory 606 causes processor 604 to perform the process steps described herein. In an alternative implementation, hard-wired circuitry may be used in place of or in combination with software instructions to implement the invention. Thus, implementations consistent with the principles of the present invention are not limited to any specific combination of hardware circuitry and software.

The term "computer-readable medium" as used herein refers to any media that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, a carrier wave as described hereinafter, or any other medium from which a computer can read.

Various forms of computer-readable media may be involved in carrying one or more sequences of instructions to processor 604 for execution. For example, the instructions may initially be carried on the magnetic disk of a remote computer. The remote computer can load the instructions into its dynamic memory and send the instructions over a telephone line using a modem. A modem (not shown) local to computer system 600 can receive the data on the telephone line and supply the data to computer 601 via a communications interface 618, which places the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 may also provide a two-way data communication coupling to a network link 620 that may be connected to a local network 622. For example, communication interface 618 may support an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 and/or to data equipment operated by an Internet Service Provider (ISP) 626. ISP 626, in turn, provides data communication services through the Internet 628. Local network 622 and Internet 628 both use electric, electromagnetic, or optical signals to carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620, and communication interface 618. In the Internet example, a server 630 might transmit requested program instructions for an application program through Internet 628, ISP 626, local network 622, and communication interface 618. Consistent with the present invention, one such downloaded application in the form of schema mapping tool 607 comprising a module for mapping data schemas and transforming data on the basis of data mappings, data layout, and data markup. The received application code may be loaded in RAM 606 and executed by processor 604 as it is received. Alternatively, or in addition, it may be stored in storage device 610, or other non-volatile storage for later execution. In this manner, computer system 600 may obtain application code in the form of a carrier wave.

Although computer system 600 is shown in FIG. 6 as being connectable to one server 630, those skilled in the art will recognize that computer system 600 may establish connections to multiple servers on Internet 628. Such servers may include a client-server or an HTML-based Internet application, which may provide information to computer system 600 upon request in a manner consistent with the present invention.

While the present invention has been described in connection with various embodiments, many modifications will be readily apparent to those skilled in the art in view of the teachings of this disclosure. One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. Accordingly, embodiments of the invention are not limited to the above described embodiments and examples, but instead is defined by the appended claims in light of their full scope of equivalents.

The foregoing description has been presented for purposes of illustration and description. It is not exhaustive and does not limit the invention to the precise forms, features or embodiments disclosed. Modifications and variations are possible in light of the above teachings and/or may be acquired from practicing embodiments of the invention. Other embodiments of the invention will be apparent to those skilled in the art from consideration of the specification and practice of the embodiments of the invention disclosed herein. Therefore, the specification and examples should be considered as exemplary only, with a true scope and spirit of the invention being indicated by the following claims.

What is claimed is:

1. A computer-implemented method for schema mapping and the transformation of data associated with first and second documents, the method comprising:
    retrieving at least a portion of the first document;
    generating one or more labels representing schema information for the at least a portion of the first document based on a schema of the first document;
    displaying simultaneously to a user, with a graphical user interface (GUI), a representation of the schema of the first document comprising the at least a portion of the first document and the one or more labels representing schema information for the at least a portion of the first document and a representation of a schema of the second document within cells of a spreadsheet application, the first and second documents having different schemas;
    acquiring, from the user, at least one association usable to map at least a first element of the first document to at least a second element of the second document, wherein each of the first and second elements contain layout data; and
    storing the association.

2. The method of claim 1, further comprising:
indicating to the user a second association between a third element of the first document and a fourth element of the second document based on the at least one association.

3. The method of claim 2, wherein indicating further comprises:
indicating the second association based on a user-specified level of probability.

4. The method of claim 1, wherein acquiring further comprises:
indicating a suggested association between a source element of the first document and a target element of the second document based on one or more stored associations between at least one instance of the schema of the first document and at least one instance of the schema of the second document.

5. The method of claim 1, wherein acquiring further comprises:
determining a mapping formula for transforming a schema of the first element in the stored association to a schema of the second element in the stored association.

6. The method of claim 5, wherein acquiring further comprises:
determining a target value based on the association and the mapping formula; and
displaying the target value.

7. The method of claim 1, further comprising:
modifying at least one of the representation of the schema of the first document and the representation of the schema of the second document;
storing the modified representation.

8. The method of claim 1, further comprising:
providing a list of unmapped elements in the first document; and
indicating that an element in the list of unmapped elements does not need to be mapped.

9. The method of claim 1, wherein acquiring further comprises:
acquiring, from the user, at least one association usable to map at least a first element of the first document to at least a second element of the first document.

10. The method of claim 1, wherein acquiring further comprises:
determining a target value based on the association, the mapping formula, and a label associated with at least one of the first element and second element; and
displaying the target value.

11. A computer-readable storage medium containing instructions for performing a method for schema mapping and data transformation, the method comprising:
retrieving at least a portion of the first document;
generating one or more labels representing schema information for the at least a portion of the first document based on a schema of the first document;
displaying simultaneously to a user, with a graphical user interface (GUI), a representation of the schema of the first document comprising the at least a portion of the first document and the one or more labels representing schema information for the at least a portion of the first document and a representation of a schema of the second document within cells of a spreadsheet application, the first and second documents having different schemas;
acquiring, from the user, at least one association usable to map at least a first element of the first document to at least a second element of the second document, wherein each of the first and second elements contain layout data; and
storing the association.

12. The computer-readable storage medium of claim 11, wherein the method further comprises:
indicating to the user a second association between a third element of the first document and a fourth element of the second document based on the at least one association.

13. The computer-readable storage medium of claim 12, wherein indicating further comprises:
indicating the second association based on a user-specified level of probability.

14. The computer-readable storage medium of claim 11, wherein acquiring further comprises:
indicating a suggested association between a source element of the first document and a target element of the second document based on one or more stored associations between at least one instance of the schema of the first document and at least one instance of the schema of the second document.

15. The computer-readable storage medium of claim 11, wherein acquiring further comprises:
determining a mapping formula for transforming a schema of the first element in the stored association to a schema of the second element in the stored association.

16. The computer-readable storage medium of claim 15, wherein acquiring further comprises:
determining a target value based on the association and the mapping formula; and
displaying the target value.

17. A system for schema mapping and data transformation, comprising:
means for retrieving at least a portion of the first document;
means for generating one or more labels representing schema information for the at least a portion of the first document based on a schema of the first document;
means for displaying simultaneously to a user, with a graphical user interface (GUI), a representation of the schema of the first document comprising the at least a portion of the first document and the one or more labels representing schema information for the at least a portion of the first document and a representation of a schema of the second document within cells of a spreadsheet application, the first and second documents having different schemas;
means for acquiring, from the user, at least one association usable to map at least a first element of the first document to at least a second element of the second document, wherein each of the first and second elements contain layout data; and
means for storing the association.

18. The system of claim 17, further comprising:
means for indicating to the user a second association between a third element of the first document and a fourth element of the second document based on the at least one association.

19. The system of claim 18, wherein the means for indicating further comprises:
means for indicating the second association based on a user-specified level of probability.

20. The system of claim 17, wherein means for acquiring further comprises:
means for indicating a suggested association between a source element of the first document and a target element of the second document based on one or more stored associations between at least one instance of the schema of the first document and at least one instance of the schema of the second document.

21. The system of claim 17, wherein means for acquiring further comprises:
    means for determining a mapping formula for transforming a schema of the first element in the stored association to a schema of the second element in the stored association.

22. The system of claim 21, wherein means for acquiring further comprises:
    means for determining a target value based on the association and the mapping formula; and
    means for displaying the target value.

23. The system of claim 17, further comprising:
    means for modifying at least one of the representation of the schema instance of the first document and the representation of the schema instance of the second document;
    means for storing the modified representation.

24. The system of claim 17, further comprising:
    means for providing a list of unmapped elements in the first document; and
    means for indicating that an element in the list of unmapped elements does not need to be mapped.

25. The system of claim 17, wherein means for acquiring further comprises:
    means for acquiring, from the user, at least one association usable to map at least a first element of the first document to at least a second element of the first document.

26. The system of claim 17, wherein means for acquiring further comprises:
    means for determining a target value based on the association, the mapping formula, and a label associated with at least one of the first element and second element; and
    means for displaying the target value.

* * * * *